E. N. HUMPHREY.
SNAP FASTENER.
APPLICATION FILED APR. 2, 1910.
964,260.
Patented July 12, 1910.
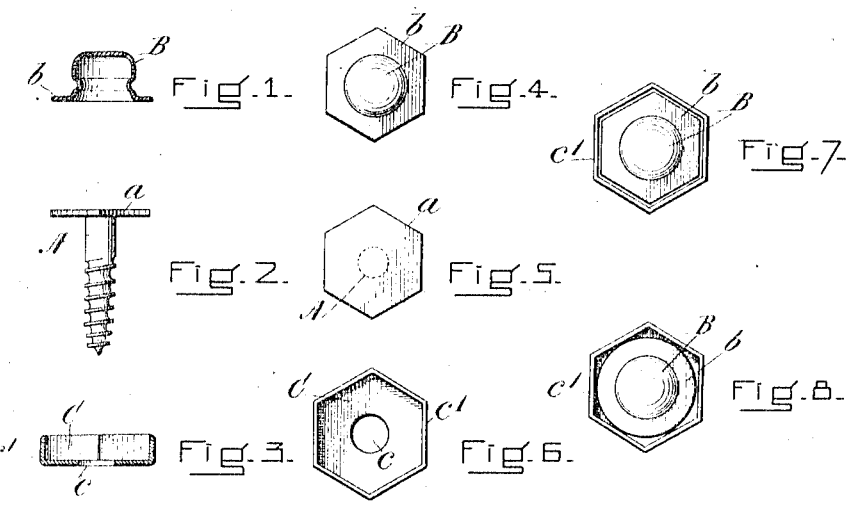
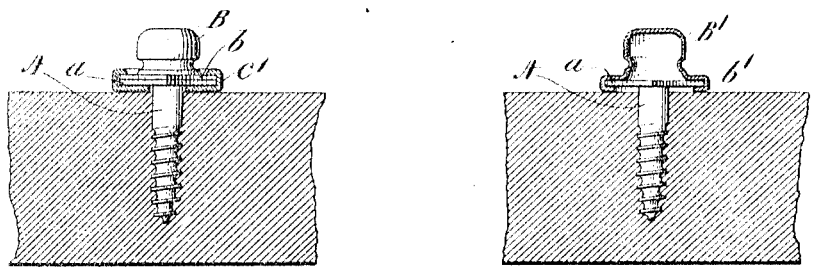
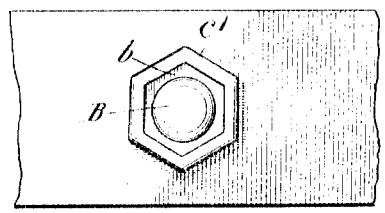
WITNESSES:
Charles J. Woodberry
Josephine H. Ayars
INVENTOR:
Ernest N. Humphrey
by Roberts & Cushman
Attorneys

UNITED STATES PATENT OFFICE.

ERNEST N. HUMPHREY, OF NEW BRITAIN, CONNECTICUT, ASSIGNOR TO UNITED STATES FASTENER COMPANY, OF BOSTON, MASSACHUSETTS, A CORPORATION OF MAINE.

SNAP-FASTENER.

964,260.

Specification of Letters Patent.

Patented July 12, 1910.

Application filed April 2, 1910. Serial No. 553,107.

*To all whom it may concern:*

Be it known that I, ERNEST N. HUMPHREY, a citizen of the United States, and resident of New Britain, in the county of Hartford and State of Connecticut, have invented new and useful Improvements in Snap-Fasteners, of which the following is a specification.

My invention relates to fasteners and more particularly to the stud member of a snap fastening pair of the type provided with means such as a screw for securing the stud to wood or similar substances.

In the fasteners of this type heretofore commonly used, the stud is provided with a flange in frictional engagement with a round-headed screw, and in some instances a small quantity of solder is placed between the socket and the head of the screw. The stud is countersunk at the top to permit the screw to be driven by a screw driver in the usual manner. It has been found in practice that when the attempt is made to attach studs of this construction to hard wood, or any other substance which offers considerable resistance to the driving of the screw, the engagement between the stud and screw head is insufficient to resist the twisting strain and prevent relative rotation of the parts, so that these fasteners have proved unsuited for use upon materials of the kind described.

It is the object of this invention to provide a stud member of the class described which shall be simple, ornamental, readily and economically manufactured and so constructed that it may be attached to hard wood or similar substances without danger of relative rotation of the parts.

Referring to the drawings, which illustrate embodiments of my invention,—Figure 1 is a sectional view of a stud; Fig. 2 is a similar view of a screw; Fig. 3 is a similar view of a collet; Fig. 4 is a plan view of the stud shown in Fig. 1; Fig. 5 is a plan view of the screw shown in Fig. 2; Fig. 6 is a plan view of the collet shown in Fig. 3; Fig. 7 is a plan view of the stud shown in Fig. 1 within the collet shown in Fig. 3; Fig. 8 is a plan view showing a modified form of stud within the collet; Fig. 9 shows, partly in section and partly in elevation, the completed fastener member attached to material; Fig. 10 is a plan view of the fastener member shown in Fig. 9; and Fig. 11 is a sectional view of a modified form.

In the preferred form of the invention shown in Figs. 1 to 9 inclusive and Fig. 10, A is a screw provided with a polygonal head *a*, shown in the drawings as hexagonal.

B is a stud having a flange *b* preferably of polygonal form as shown in Figs. 4 and 7 to conform to the shape of the screw head *a*, but which may be of circular form as shown in Fig. 8, or of any other desired form.

C is a collet provided with a central opening *c* and a flange *c'* of the same polygonal form as the screw head *a*.

In assembling the parts, the shank of the screw A is passed through the opening *c* bringing the collet C into engagement with the lower face of the screw head *a*. The flange *b* of the stud B is then placed upon the upper face of the screw head *a* and the flange *c'* is turned down by a suitable tool into holding engagement with the flange *b* thus rigidly securing the screw head and stud which are held against relative rotation by reason of their polygonal form.

In Fig. 11 there is shown a modified form of stud whereby the stud and screw head may be rigidly secured, and held against relative rotation, without the use of a collet. Referring to said figure, B' is a stud having a polygonal flange *b'* of the same shape as the screw head *a* and of sufficient size to receive said screw head. In assembling the parts in this form of my invention, the screw head *a* is placed within the flange *b'* and the latter is then turned down by a suitable tool into holding engagement with the screw head thus rigidly securing the stud and head which, as in the preferred form already described, are held against relative rotation by their polygonal shape.

In securing my improved fastener to material, the screw driving tool is not placed upon the head of the stud as in prior constructions, but around the polygonal portion of the stud which, by reason of its shape, is readily gripped and held thereby. The twisting strain necessarily incident to driving the screw home, is thus borne almost entirely by that portion of the fastener best adapted to withstand it, namely, the head of the screw; and as no twisting strain is placed upon the stud B, all danger of relative rotation of the parts is eliminated.

Although any suitable tool may be employed for screwing the stud to material, I prefer one having an opening adapted to fit the polygonal portion and provided with a recess to receive the head of the stud.

I claim:

1. In a fastener member, the combination with a stud having a flange, of a screw provided with a polygonal head, and a collet having a polygonal flange adapted rigidly to secure said stud and said head.

2. In a fastener member, the combination with a screw having a polygonal head, of a stud having a polygonal flange in engagement with the upper face of said head, and a collet in engagement with the lower face of said head having a polygonal flange turned over into holding engagement with the flange of said stud.

Signed by me at New Britain, Connecticut, this twenty-sixth day of March, 1910.

ERNEST N. HUMPHREY.

Witnesses:
A. H. HOUGHTON,
G. C. HOLMES.